9694X
J. Goodyear Jr.
Clover Huller.
Patented June 2. 1836.
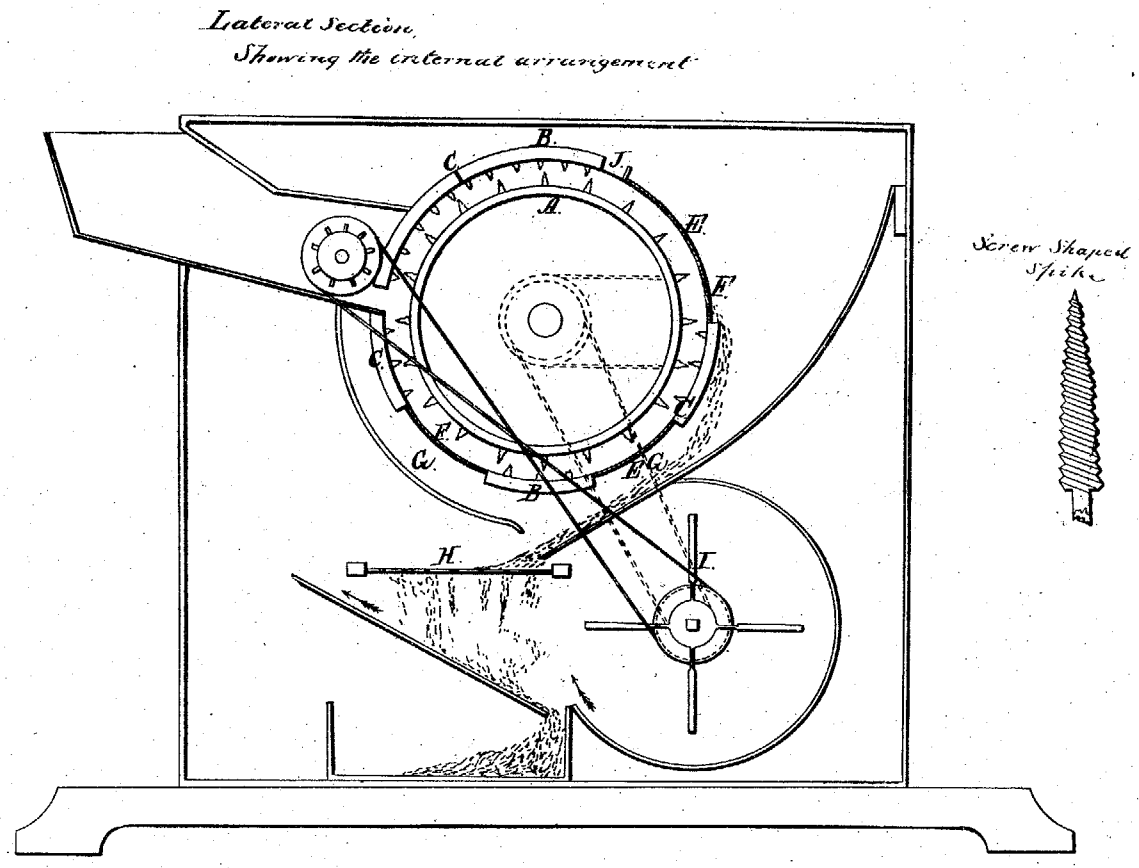
THE NORRIS PETERS CO., WASHINGTON, D. C.

John Goodyear Junr. of South Middleton
Township ... and State of Pennsylvania —

Letters Patent

The schedule referred to in these Letters Patent and making
part of the same containing a description in the words of the
said John Goodyear Junr. himself of his improvement in
the Machine for threshing and cleaning Clover seed To all to whom these presents shall come.
Be it known that I John Goodyear Jr. of Southmiddleton
Township Cumberland County and State of Pa. have invented
a new and useful improvement in the machine for threshing
and cleaning Clover Seed, and that the following is a full
and exact description and construction and operation of the
said machine as invented or improved by me.
The machine is designed to be propelled by one or more
horses, the horse or horses turn the [illegible] power as usually
applied to the [illegible] threshing machines now in use, the cog
wheel turns a shaft which by a band turns the cylinder of the
machine in the same manner that the cylinder of Humphreys
Threshing machine, the cylinder may be varied in size from
nine to twenty four inches in diameter and from two to four feet
in length, with a concave extending from where the seed is de
livered round to the lower part of the hopper, the cylinder
is covered with sheet iron tightly fastened and from ten to
twenty or upwards rows of [illegible] spikes or screws extending
out from one to two inches the concave is divided in
three parts, the two first parts commencing at the hopper
are covered with sheet iron and having eight or ten rows
of spikes or screws similar to those in the cylinder, in the
the next part is placed a wire screen then another [illegible]

then another [illegible] with two rows of spike or screws then another row
with two rows of spike or screws, then another screw, which will
leave one tenth part to receive the seed at which place the hopper
is placed. the spike or screws on the cylinder are placed regular
but alternately with those in the concave and play between them
in the revolution of the cylinder, round the concave is placed a
conductor to conduct the seed to the centre immediately below
the cylinder where it falls on a wire sifter and is cleaned
by the fans placed under the conductor. The fans are similar
to those used in windmills and turned by a band from a
small pulley on the cylinder shaft. In the hopper is placed
a roller with six or eight rows of spikes in it which is turned
by a band from the shaft of the fans, which will feed the
machine and between the first screws and stay in the con
cave a space of one inch is left open to give it air, the
machine is firmly placed and secured in a frame similar
to Humphrey's improved threshing Machine, What is claimed
as new invention or discovery in the Machine are the [illegible]
ted spikes or screws, and the wire sifter or screws in the
concave and in the adaptation of the machine to the threshing
or cleaning of clover seed
In testimony that the above is a full description
of my improvement as invented by me, I have hereunto
set my hand, this twentieth day of February in the
year eighteen hundred and thirty six Witnesses } John Goodyear Jr. (L.S.)
J. Miller
B. K. Morsell

[illegible]

Drawing

[illegible] 6494